United States Patent [19]
Ojima

[11] Patent Number: 5,659,681
[45] Date of Patent: Aug. 19, 1997

[54] BUS MONITOR CIRCUIT FOR SWITCHING SYSTEM

[75] Inventor: Sawako Ojima, Tokyo, Japan

[73] Assignee: NEC Corporation, Tokyo, Japan

[21] Appl. No.: 566,597

[22] Filed: Dec. 4, 1995

Related U.S. Application Data

[63] Continuation of Ser. No. 159,331, Nov. 30, 1993, abandoned.

[30] Foreign Application Priority Data

Nov. 30, 1992 [JP] Japan ..................... 4-319572

[51] Int. Cl.$^6$ ..................... G01R 31/28; G06F 11/00
[52] U.S. Cl. ..................... 395/183.19; 395/183.21; 370/244
[58] Field of Search ............... 395/183.19, 183.21, 395/183.22; 370/14

[56] References Cited

U.S. PATENT DOCUMENTS

| | | | |
|---|---|---|---|
| 4,041,253 | 8/1977 | Altenburger | 379/2 |
| 4,209,846 | 6/1980 | Seppa | 371/29.1 |
| 4,322,791 | 3/1982 | Ishii | 371/29.1 |
| 4,340,776 | 7/1982 | Ganz | 178/3 |
| 4,481,582 | 11/1984 | Edsbacker | 371/29.1 |
| 4,638,477 | 1/1987 | Okada | 370/94 |
| 4,644,533 | 2/1987 | Braff | 370/94 |
| 4,672,611 | 6/1987 | Fukuhara et al. | 371/29.1 |
| 4,932,028 | 6/1990 | Katircioglu et al. | 371/16.5 |
| 4,949,252 | 8/1990 | Hauge | 371/29.1 |
| 4,967,344 | 10/1990 | Scavezze | 364/200 |
| 5,047,977 | 9/1991 | Hill et al. | 371/16.5 |
| 5,253,184 | 10/1993 | Kleinschnitz | 371/29.1 |
| 5,297,277 | 3/1994 | Dein et al. | 395/575 |
| 5,351,243 | 9/1994 | Kalkunte | 370/92 |
| 5,410,536 | 4/1995 | Shah | 370/13 |

OTHER PUBLICATIONS

IBM Technical Disclosure Bulletin, vol. 34, No. 2, Jul. 1991, New York US pp. 98–99, XP210584, "High–Speed Network Adapter Error Trace Mechanism".
Hewlett–Packard Journal, vol. 43, No. 5, Oct. 1992, Palo Alto US pp. 34–40, XP349772, R.J. Prufer "Network Advisor Protocol Analysis: Decodes".

Primary Examiner—Hoa T. Nguyen
Assistant Examiner—Glenn Snyder
Attorney, Agent, or Firm—Foley & Lardner

[57] ABSTRACT

In a switching system, a data bus is provided for interconnecting circuit modules, a switching network module and a control module for transporting packets between the interconnected modules. A bus interface (16) is connected to the data bus (13) for receiving a copy of every packet on the data bus. An error detector (18) determines whether the received packet contains an error, and produces an error detect signal and an error check result if the received packet is determined as having an error. In response to the error detect signal, the received packet, the error check result and time-of-day data are stored into a register (19) and transferred to one of the storage locations of a memory (20) to keep a list of error records. A maintenance station (22) reads stored error records from the memory for identifying the source of errors.

2 Claims, 1 Drawing Sheet

BUS MONITOR CIRCUIT FOR SWITCHING SYSTEM

This application is a continuation of application Ser. No. 08/159,331, filed Nov. 30, 1993, now abandoned.

BACKGROUND OF THE INVENTION

1. Field of the Invention

The present invention relates generally to switching systems, and more specifically to a maintenance system for keeping error records of a switching system.

2. Description to the Related Art

In conventional switching systems functional modules are interconnected by a data bus and packets are transported between the modules over the data bus. When an abnormal condition occurs in the system, a logic analyzer is brought into the system and hand-wired to the data bus for monitoring the packets transported along the bus. However, the use of the logic analyzer requires a special team of experts. Additionally, the logic analyzer is not provided with a sufficient amount of memory for storing records to be analyzed to allow identification of the fault.

SUMMARY OF THE INVENTION

It is therefore an object of the present invention to provide a bus monitor circuit for monitoring packets on the data bus of a switching system and keeping error records for maintenance purposes.

According to the present invention, there is provided a bus monitor circuit for a switching system. The switching system comprises circuit modules, a switching network module, and a control module for controlling the circuit modules and the switching module. All the modules are interconnected by a data bus for transporting a packet between the interconnected modules. The bus monitor circuit comprises a memory having a plurality of storage locations, time-keeping means for generating time-of-day data, and an interface connected to the data bus for receiving a copy of the packet therefrom. An error detector is provided for determining whether the packet contains an error, and producing an error detect signal and an error check result if the packet is determined as having an error. In response to the error detect signal, the copy of the packet, the error check result and the time-of-day data are stored into one of the storage locations of the memory. A maintenance station is provided for reading stored contents of the memory.

BRIEF DESCRIPTION OF THE DRAWINGS

The present invention will be described in further detail with reference to the accompanying drawings, in which.

DETAILED DESCRIPTION

Figure 1:
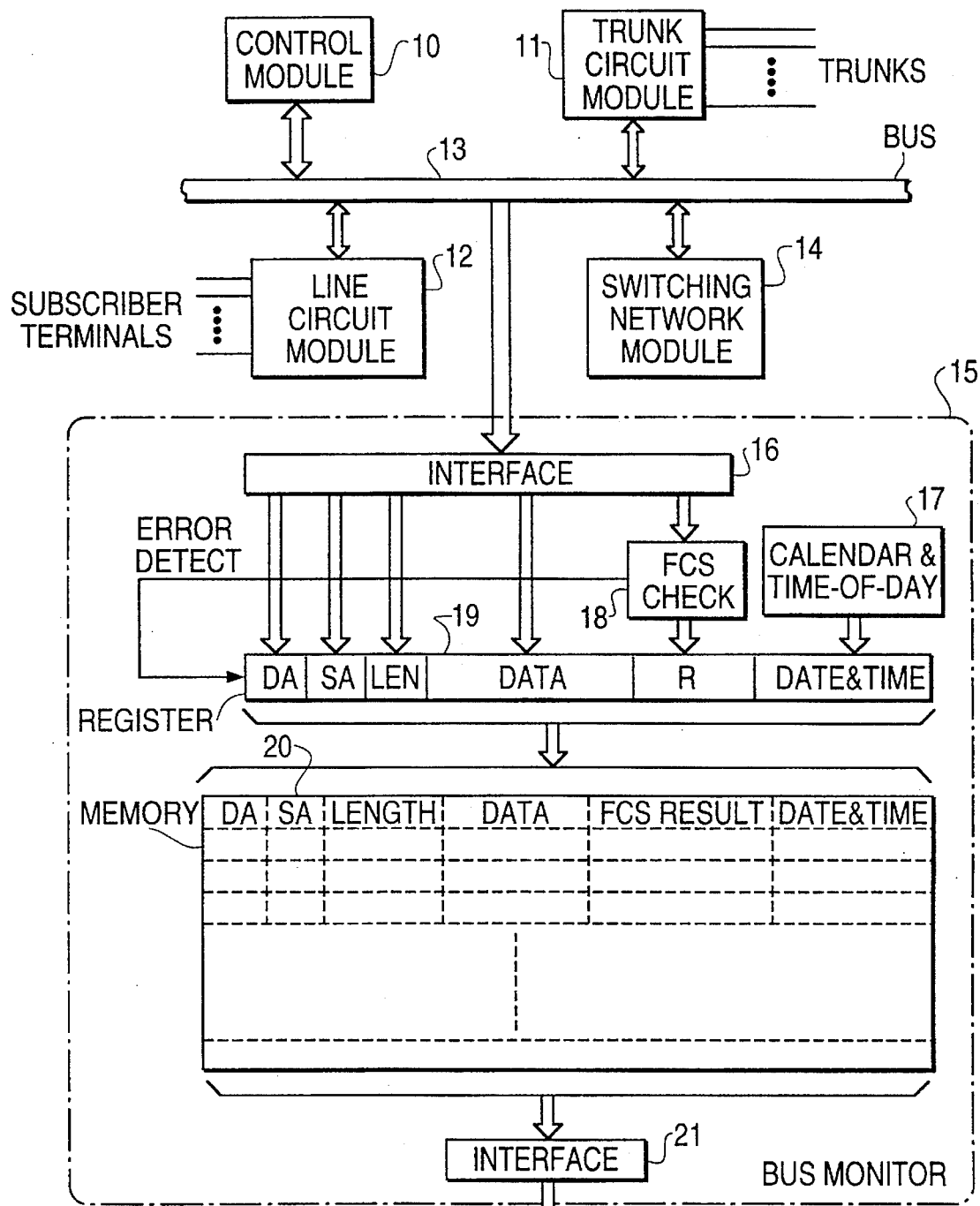
FIG. 1 shows in block form a switching system embodying a bus monitor of the present invention.

Referring now to FIG. 1, there is shown a switching system according to the present invention. In the switching system, inter-office trunks or transmission lines are terminated at a trunk circuit module 11 which controls the inter-office trunks in response to a command signal from a control module 10. Subscriber lines are terminated at a line circuit module 12 which controls the subscriber lines in response to a command signal from the control module 10.

Figure 2:
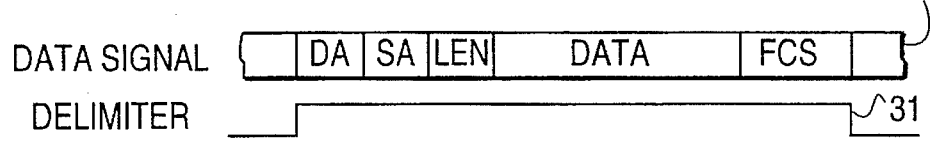
FIG. 2 shows the structure of signals transported on the data bus of FIG. 1.

Both of circuit modules 11 and 12 are connected to a data bus 13 to transfer data and speech signals to a switching network module 14 where these signals are switched between lines and trunks by way of the data bus under control of the control module 10 in a manner known in the art. The control module 10 further provides overall control of the system including maintenance and administrative tasks of the system. As shown in FIG. 2, the signal transported on the data bus 13 comprises a data signal 30 and a delimiter 31 which indicates the effective area of the data signal. The data signal is transmitted in packet format which begins with a destination address field (DA) followed by a source address field (SA), a data length field (LEN), a data field (DATA) and a frame check sequence field (FCS) for detecting error bits.

According to the present invention, a bus monitor 15 is provided which comprises a bus interface 16 connected to the data but 13 for receiving every packet transported on the data bus using a delimiter 31 as a gate pulse and supplying the DA, SA, LEN and DATA fields of a copy of the received packet to a register 19 and the FCS field of the packet to a known FCS check circuit 18 as illustrated. A calendar and time-of-day clock source 17 is provided for generating date and time-of-day data. If an error is detected as a result of an FCS check, the FCS check circuit 18 produces an error detect signal and applies it to the register 19 as an enable pulse to store the DA, SA, LEN and DATA fields of the copy of the packet to corresponding storage areas of register 19 and the result of the FCS check into a result area "R" of the register. At the same time, the date and time-of-day data are supplied to a "DATE & TIME" area of the register.

When register 19 is filled, all the stored error-containing data are transferred from the register to a memory 20 as a first error record. When a subsequent packet is received from the data bus, a similar process is repeated and stored into the memory 20 with an FCS check result and date and time-of-day data as a second error record if the subsequent packet is determined as containing an error. If no error is detected by the FCS check circuit 18, no record is stored in memory 20. As the process continues, the memory 20 will be filled with a plurality error records as system diagnostic data.

At appropriate times, all the stored error records are read from the memory 20 by way of an interface 21 into a maintenance station, or video display terminal 22 to provide a display of a list of error records on a video screen. The displayed error records may be analyzed by maintenance personnel to locate the source of the trouble.

What is claimed is:

1. A bus monitor circuit for a switching system comprising a plurality of circuit modules to which lines and trunks are terminated, a switching network module, a control module for controlling said circuit modules and said switching network module, and a data bus interconnecting said circuit modules, said switching network module receiving packets from said circuit modules and switching the received packets between said lines and said trunks via said data bus under control of said control module, said circuit modules controlling said lines and trunks in response to a command signal from said control module, said packets each comprising a destination address, a source address, a data field and a frame check sequence (FCS), the bus monitor circuit comprising:

time-keeping means for generating time-of-day data;

an interface connected to said data bus for receiving a copy of a packet therefrom;

an FCS check means for receiving the frame check sequence of the copy of the packet and determining whether the packet contains an error, and producing an error detect signal and an error check result if said packet is determined as having an error;

register means for storing, when the packet is determined to have an error, the destination address, the source address and the data field of the copy of the packet, said error check result and corresponding time-of-day data to produce an error record;

a memory having a plurality of storage locations for storing said error record into one of the storage locations of said memory in response to said error detect signal; and a maintenance station for reading stored error records from said memory.

2. A bus monitor circuit as claimed in claim 1, wherein the time-keeping means further generates a calendar date signal which is stored into said storage location of the memory in response to said error detect signal.

* * * * *